United States Patent
Wu et al.

(10) Patent No.: US 6,221,481 B1
(45) Date of Patent: Apr. 24, 2001

(54) HIGH CR, LOW SATURATION MAGNETIZATION INTERMEDIATE MAGNETIC LAYER FOR HIGH COERCIVITY AND LOW MEDIUM NOISE

(75) Inventors: Zhong (Stella) Wu, Fremont; Rajiv Y. Ranjan, San Jose, both of CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/188,715

(22) Filed: Nov. 10, 1998

Related U.S. Application Data
(60) Provisional application No. 60/069,538, filed on Dec. 12, 1997.

(51) Int. Cl.$^7$ .................................................. G11B 5/66
(52) U.S. Cl. ...................... 428/332; 428/336; 428/694 T; 428/694 TS; 428/900
(58) Field of Search .......................... 428/694 T, 694 TS, 428/900, 336, 332

(56) References Cited

U.S. PATENT DOCUMENTS

| | | | |
|---|---|---|---|
| 5,580,667 | * 12/1996 | Lal et al. | 428/610 |
| 5,922,442 | * 7/1999 | Lal | 428/216 |
| 5,922,456 | * 7/1999 | Tanahashi | 428/332 |
| 5,952,097 | * 9/1999 | Zhang | 428/332 |
| 5,968,679 | * 10/1999 | Kobayashi | 428/694 TS |
| 6,022,609 | * 2/2000 | Gao et al. | 428/141 |

OTHER PUBLICATIONS

"The control and Characterization of . . ." D.E. Laughlin, et al., IEEE Transactions on Magnetics, vol. 32, No. 5, Sep. 1996.*

"NiAl Underlayers For CoCrTa Magnetic Thin Films", Li–Lien Lee, et al., IEEE Transactions on Magnetics, vol. 30, No. 6, Nov. 1994.

"Effects of Cr Intermediate Layers on CoCrPt Thin Film Media on NiAl Underlayers", Li–Lien Lee, et al., IEEE Transactions on Magnetics, vol. 31, No. 6, Nov. 1995.

"Seed Layer Induced (002) Crystallographic Texture In NiAl Underlayers", Li–Lien Lee, et al., Journal of Applied Physics 79, No. 8, Apr. 15, 1996.

"The Control And Characterization of The Crystallographic Texture of Longitudinal Thin Film Recording Media", David E. Laughlin, et al., IEEE Transactions on Magnetics vol. 32, No. 5, Sep. 1996.

"The Role of NiAl Underlayers in Longitudinal Recording Media (Abstract)", C.A. Ross et al., Journal of Applied Physics, vol. 81, No. 8, Apr. 15, 1997.

* cited by examiner

*Primary Examiner*—Leszek Kiliman
(74) *Attorney, Agent, or Firm*—McDermott, Will & Emery

(57) ABSTRACT

High areal density magnetic recording media exhibiting high Hr and low medium noise are formed with a thin CoCrTa intermediate layer having a high Cr content, such as above 15 atomic % to about 20 atomic % Cr, e.g., about 16 to about 17 atomic % Cr. The high Cr content of the CoCrTa intermediate magnetic alloy layer provides a smooth lattice match transition for epitaxial growth of a magnetic layer thereon exhibiting high anisotropy, thereby achieving high Hr and high SNR. Embodiments include depositing the high Cr content CoCrTa intermediate layer at a thickness of about 5 to about 50 Å on a Cr-alloy underlayer.

11 Claims, 4 Drawing Sheets

HIGH CR, LOW SATURATION MAGNETIZATION INTERMEDIATE MAGNETIC LAYER FOR HIGH COERCIVITY AND LOW MEDIUM NOISE

RELATED APPLICATIONS

This application claims priority from Provisional Application Ser. No. 60/069,538 filed on Dec. 12, 1997 entitled "HIGH CONTENT, LOW SATURATION MAGNETIZATION INTERMEDIATE MAGNETIC LAYER FOR HIGH COERCIVITY AND LOW NOISE MEDIA", the entire disclosure of which is hereby incorporated herein by reference.

This application contains subject matter related to subject matter disclosed in copending application Ser. No. 09/188,681, filed on Nov. 10, 1998, now pending and related to subject matter disclosed in copending application Ser. No. 09/188,682, filed on Nov. 10, 1998, now pending the entire disclosures of which are incorporated herein by reference.

1. Technical Field

The present invention relates to magnetic recording media, such as thin film magnetic recording disks, and to a method of manufacturing the media. The invention has particular applicability to high areal density magnetic recording media exhibiting low noise, high remanent coercivity and high coercivity squareness.

2. Background Art

The requirements for increasingly high areal recording density impose increasingly greater demands on thin film magnetic recording media in terms of remanent coercivity (Hr), magnetic remanance (Mr), coercivity squareness (S*), medium noise, i.e., signal-to-noise ratio (SNR), and narrow track recording performance. It is extremely difficult to produce a magnetic recording medium satisfying such demanding requirements.

The linear recording density can be increased by increasing the Hr of the magnetic recording medium and, at the same time, decreasing the medium noise, as by maintaining very fine magnetically non-coupled grains. Medium noise is a dominant factor restricting increased recording density of high density magnetic hard disk drives. Medium noise in thin films is attributed primarily to inhomogeneous grain size and intergranular exchange coupling. Accordingly, in order to increase linear density, medium noise must be minimized by suitable microstructure control.

A conventional longitudinal recording disk medium is depicted in FIG. 1 and comprises a substrate 10, typically an (Al)-alloy, such as an Al-magnesium (AlMg) alloy plated with a layer of amorphous nickel-phosphorus (NiP). Alternative substrates include glass, ceramic and glass-ceramic materials, as well as graphite. There are typically sequentially sputter deposited on each side of substrate 10 an optional adhesion enhancement layer 11, 11', a seedlayer 12, 12', such as NiP, an underlayer 13, 13', such as chromium (Cr) or a Cr alloy, a magnetic layer 14, 14', such as a cobalt (Co)-based alloy, and a protective overcoat 15, 15', such as a carbon-containing overcoat. Typically, although not shown for illustrative convenience, a lubricant topcoat is applied on the protective overcoat 15, 15'.

It is recognized that the magnetic properties, such as Hr, Mr, S* and SNR, which are critical to the performance of a magnetic alloy film, depend primarily upon the microstructure of the magnetic layer which, in turn, is influenced by the underlying layers, such as the underlayer. It is also recognized that underlayers having a fine grain structure are highly desirable, particularly for growing fine grains of hexagonal close packed (HCP) Co alloys deposited thereon.

It has been reported that nickel-aluminum (NiAl) films exhibit a grain size which is smaller than similarly deposited Cr films, which are the underlayer of choice in conventional magnetic recording media. Li-Lien Lee et al., "NiAl Underlayers For CoCrTa Magnetic Thin Films", IEEE Transactions on Magnetics, Vol. 30, No. 6, pp. 3951–3953, 1994. Accordingly, NiAl thin films are potential candidates as underlayers for magnetic recording media for high density longitudinal magnetic recording. However, it was found that the coercivity of a magnetic recording medium comprising a NiAl underlayer is too low for high density recording, e.g. about 2,000 Oersteds (Oe).

Lee et al. subsequently reported that the coercivity of a magnetic recording medium comprising a NiAl underlayer can be significantly enhanced by depositing a plurality of underlayers containing alternative NiAl and Cr layers rather than a single NiAl underlayer. Li-Lien Lee et al., "Effects of Cr Intermediate Layers on CoCrPt Thin Film Media on NiAl Underlayers," Vol. 31, No. 6, Nov. 1995, pp. 2728–2730. It was found, however, that such a magnetic recording medium is characterized by an underlayer structure exhibiting a (110)-dominant crystallographic orientation which does not induce the preferred (1120)-dominant crystallographic orientation in the subsequently deposited Co alloy magnetic layer and is believed to contribute to increased media noise. Li-Lien Lee et al. were able to obtain an underlayer exhibiting a (200)-dominant crystallographic orientation by initially depositing a Cr sub-underlayer directly on the non-magnetic substrate at an undesirably high temperature of about 260° C. using radio frequency (RF) sputtering. However, deposition of a Cr sub-underlayer at such an elevated temperature undesirably results in large grains, which is inconsistent with the reason for employing NiAl as an underlayer. On the other hand, it is very difficult to obtain a Cr (200)-dominant crystallographic orientation, even at elevated temperature such as 260° C., on glass, ceramic and glass ceramic substrates using direct current (DC) magnetron sputtering, which is widely employed in the magnetic recording media industry.

Li-Lien Lee et al. recognized the undesirability of resorting to high deposition temperatures to obtain a (200)-dominant crystallographic orientation in the underlayer structure. It was subsequently reported that an underlayer structure exhibiting a (200)-dominant crystallographic orientation was obtained by depositing a magnesium oxide (MgO) seedlayer using radio frequency (RF) sputtering. Li-Lien Lee et al., "Seed layer induced (002) crystallographic texture in NiAl underlayers," J. Appl. Phys. 79 (8), Apr. 15, 1996, pp. 4902–4904; and David E. Laughlin et al., "The Control and Characterization of the Crystallographic Texture of the Longitudinal Thin Film Recording Media," IEEE Transactions on Magnetics, Vol. 32, No. 5, September 1996, pp. 3632–3637. Such a magnetic recording medium, however is not commercially viable from an economic standpoint, because sputtering systems in place throughout the industry making magnetic recording media are based upon direct current (DC) sputtering. Accordingly, RF sputtering an MgO seedlayer is not economically viable. The use of an NiAl underlayer is also disclosed by C. A. Ross et al., "The Role Of An NiAl Underlayers In Longitudinal Thin Film Media" and J. Appl. Phys. 81(a), P.4369, 1996.

Conventional practices in manufacturing magnetic recording media comprise Direct Current (DC) magnetron sputtering and high temperatures in order to obtain Cr segregation in Co-alloy grain boundaries to achieve high Hr and high SNR. Conventional practices, therefore, employ a high substrate heating temperature, e.g. above about 200° C., e.g. about 230° C. to about 260° C., in order to achieve a desirably high Hr. However, such high substrate heating temperatures result in a reduced S* and, hence, increased medium noise. In order to increase information storage capacity, recording media with higher Hr and lower medium noise are manifestly required. Higher Hr narrows the pulse width, thereby enabling reduction of the bit length for higher recording density, while lower media noise leads to higher SNR.

In order to increase Hr, magnetic alloys containing platinum (Pt), such as Co—Cr—Pt-tantalum (Ta) alloys have been employed. Although Pt enhances film Hr, it was found that Pt also increases media noise. Accordingly, it has become increasingly difficult to achieve high areal recording density while simultaneously achieving high SNR and high Hr.

As media noise predominately stems from exchange and magnetostatic interactions among magnetic grains, SNR can be improved by minimizing such interactions. For example, such interactions can be suppressed by separating or segregating the magnetic grains either physically or chemically. Prior efforts in this area, however, have dealt with relatively low Hr media, e.g. less than about 2,000 Oe. Little effort, to date, has been devoted to increasing Hr and simultaneously reducing media noise for high areal recording density medium.

Accordingly, there exists a need for high density magnetic recording media and methodology for achieving high Hr with high S* and high SNR. There exists a particular need for magnetic recording media containing a CoCrPtTa magnetic alloy layer exhibiting high Hr, high S* and high SNR.

DISCLOSURE OF THE INVENTION

An object of the present invention is a magnetic recording medium for high areal recording density exhibiting low noise, high Hr and high S*.

According to the present invention, the foregoing and other objects are achieved by a magnetic recording medium comprising a non-magnetic substrate; an underlayer on the substrate; an intermediate layer, comprising an alloy of cobalt, greater than about 15 to about 20 atomic % chromium and tantalum, on the underlayer; and a magnetic layer on the intermediate layer.

Another aspect of the present invention is a magnetic recording medium comprising; a non-magnetic substrate; a chromium or chromium alloy underlayer, exhibiting a (200)-dominant crystallographic orientation, on the substrate; an intermediate layer, comprising an alloy of cobalt, about 16 to about 20 atomic % chromium, and about 1 to about 6 atomic % tantalum, exhibiting a (11.0)-dominant crystallographic orientation, on the underlayer; and a CoCrPtTa magnetic alloy layer on the intermediate layer. Additional objects and advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature, and not as restrictive.

DESCRIPTION OF THE INVENTION

Figure 1:
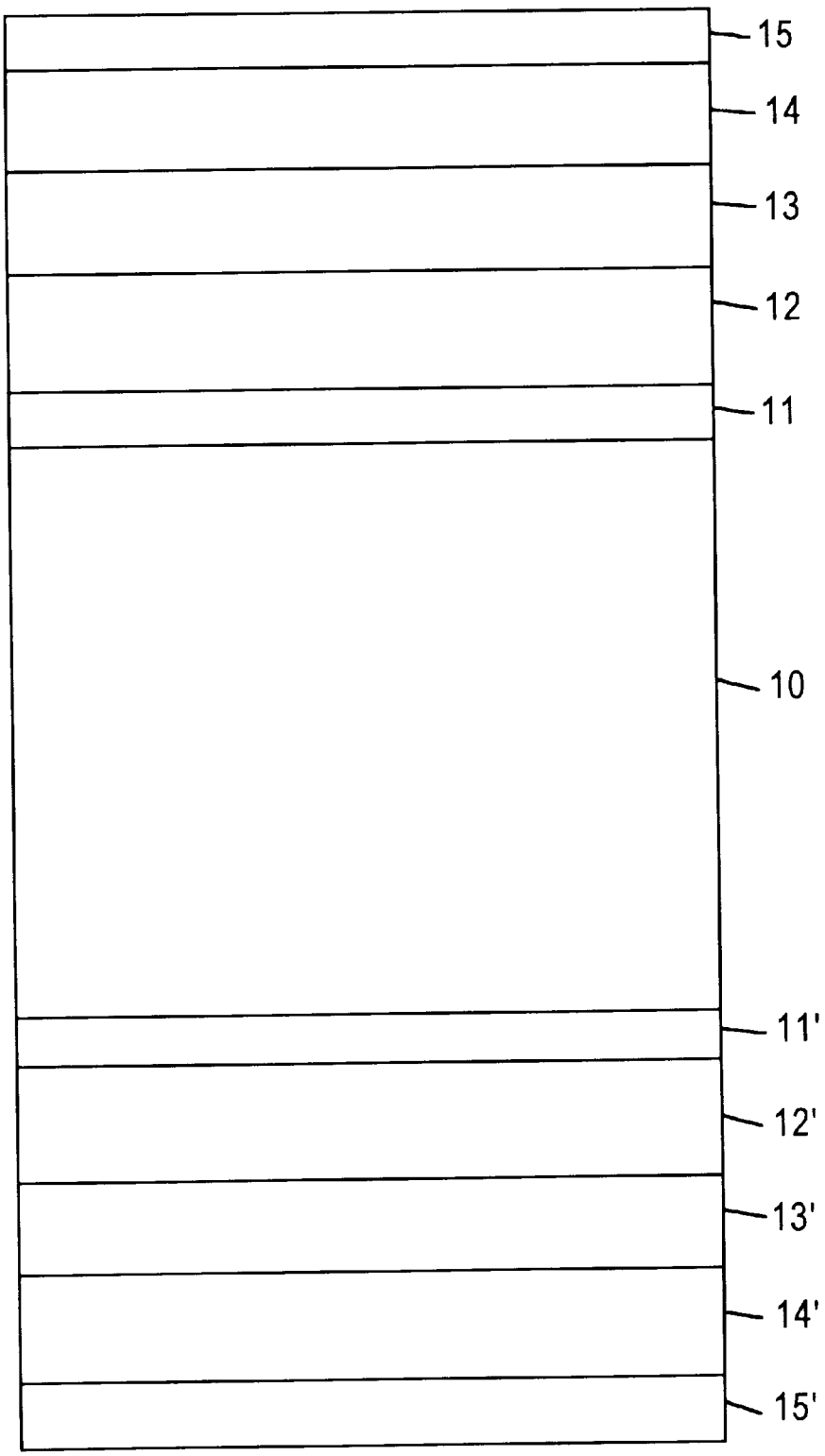
FIG. 1 schematically depicts a conventional magnetic recording medium structure.

The present invention provides magnetic recording media suitable for high areal recording density exhibiting high Hr, high S* and high SNR. In accordance with embodiments of the present invention, desirably high Hr, S* and SNR are achieved by the strategic deposition of a thin magnetic Co-alloy containing Cr and tantalum (Ta). After extensive experimentation and investigation, it was found that the sputter deposition of a CoCrTa alloy having a relatively high Cr content, such as greater than 15 atomic % Cr up to about 20 atomic % Cr, e.g., between about 16 and about 17 atomic % Cr, exhibit low saturation magnetization and a close lattice constant to match underlayer (200) lattice planes, such as a Cr or a Cr alloy underlayer. Accordingly, the high Cr content CoCrTa intermediate alloy layer can be readily grown epitaxially with a (11.0)-dominant crystallographic orientation characteristic of hexagonal close packed (hcp) Co alloys, particularly on a Cr alloy underlayer comprising vanadium (V), titanium (Ti) or molybdenum (Mo). The epitaxially grown high.Cr CoCrTa intermediate layer of the present invention with a (11.0)-dominant crystallographic orientation provides a nucleation seedlayer for subsequently deposited highly aniostropic magnetic layers, particular CoCrPtTa layers. Due to what can be characterized as a like-atom growth effect, the high Cr content CoCrTa intermediate layer grows magnetic grains segregated by a non-magnetic Cr or Cr alloy matrix. Such segregation of the magnetic grains provides a superior way to reduce exchange interactions among magnetic grains and suppress medium noise and, simultaneously, reduces the effective saturation magnetization thereby minimizing magnetostatic interaction in the media.

The high Cr content CoCrTa intermediate layer alloys of the present invention typically contain about 1 to about 6 atomic % Ta and can be deposited at a relatively small thickness, e.g. about 5 Å to about 50 Å. The magnetic recording media of the present invention can comprise any of various types of substrates conventionally employed in the manufacture of magnetic recording media, such as NiP-plated Al or Al-alloys, e.g. AlMg, and glass substrates.

It is believed that the matching of the high Cr content CoCrTa intermediate layer with the underlayer, particularly Cr alloy underlayers, enables epitaxial growth of a highly anisotropic magnetic layer, such as CoCrPtTa magnetic layers, having c-axes aligned into the film plane thereby achieving higher Hr and better S*. Thus, magnetic recording media according to the present invention are highly suitable for longitudinal recording.

The present invention encompasses the use of any of various magnetic alloy layers conventionally employed in the manufacture of magnetic recording media, such as Co alloys, e.g. Co alloys containing Cr, platinum (Pt) and Ta, as well as CoCrTa magnetic layers. In sputter depositing the magnetic layer on the intermediate layer, inclusive of CoCrTa magnetic layers, a defined interface is formed between the intermediate layer and the magnetic layer. The intermediate layer substrate surface provides appropriate crystalline orientation and surface morphology for nucleation and growth of the magnetic layer thereon.

Advantageous results have been achieved employing a CoCrPtTa alloy, with 8%. Pt atomic composition. The present invention also encompasses the use of conventional adhesion layers, such as Cr or Cr-alloys, and seedlayers, such as NiP.

The strategic use of a high Cr content CoCrTa intermediate layer in accordance with embodiments of the present invention also enables sputter deposition of subsequently applied layers at lower substrate temperatures than those conventionally employed, to achieve a desirably high Hr without sacrificing S* or SNR. Thus, sputter deposition of magnetic layers and protective overcoats can be conducted at a temperature less than about 200° C., e.g., about 100° C. to about 150° C.

Figure 2:
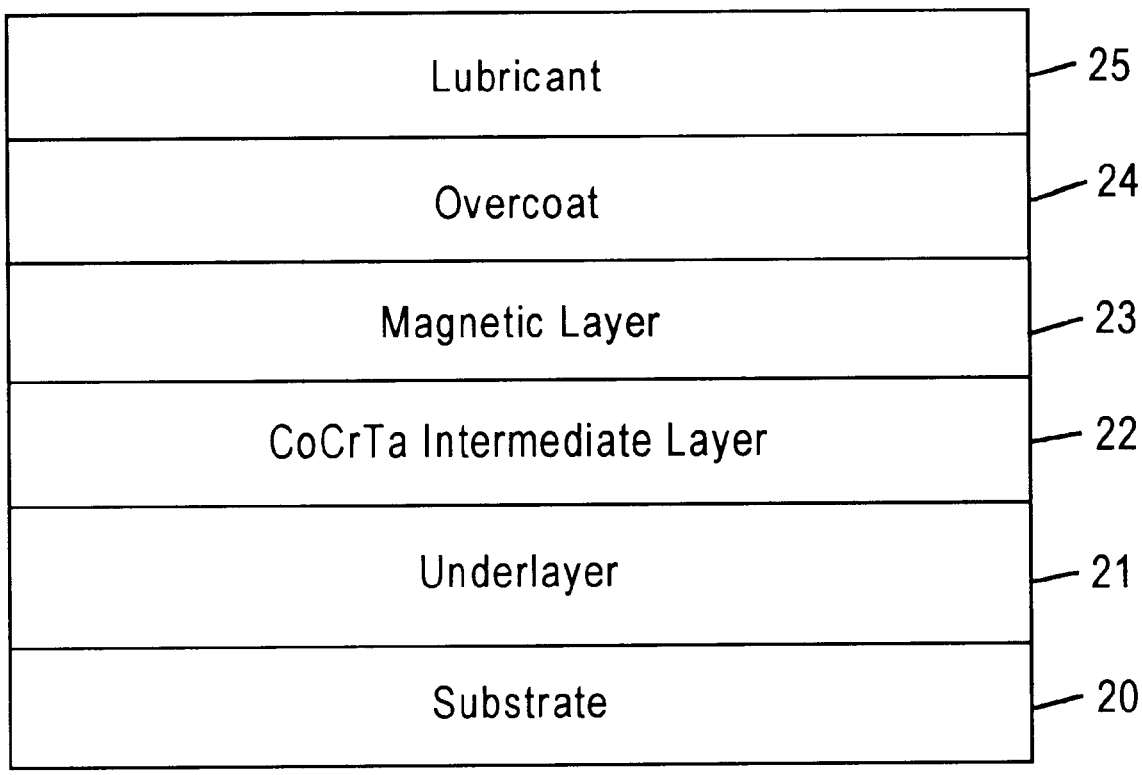
FIG. 2 schematically depicts a magnetic recording medium in accordance with an embodiment of the present invention.

An embodiment of the present invention is schematically illustrated in FIG. 2 and comprises substrate 20. For illustrative convenience, the sequentially deposited layers are shown only on one side of substrate 20. However, it is understood that the present invention comprises sputter depositing sequential layers on both sides of substrate 20, as in FIG. 1.

Adverting to FIG. 2, an underlayer 21, e.g. CrV, is sputter deposited on substrate 20, which can be NiP-plated AlMg, or a glass, ceramic or glass-ceramic material. A thin high Cr content CoCrTa intermediate layer 22 is sputter deposited on underlayer 21 and a magnetic layer 23, e.g. CoCrTa or CoCrPtTa, is sputter deposited on intermediate layer 22. A carbon-containing protective overcoat 24 is sputter deposited on magnetic layer 23. A lubricant topcoat is then applied to protective overcoat 24.

EXAMPLE

Magnetic recording media were prepared by direct current (DC) magnetron sputtering on NiP/Al substrates employing a static sputtering system. The base pressure was typically $2 \times 10^{-7}$ Torr. The substrates were pretreated at 200–300° C. and were biased at −250V. The sputtering argon flow rate was about 15 sccm. The layer configuration comprised a CrV underlayer, $CoCr_{16}Ta_4$ and $CoCr_4Ta_4$ intermediate layers, a $CoCr_{15}Pt_8Ta_4$ magnetic layer and a carbon overcoat. The thickness of the intermediate and magnetic layers were varied. The magnetic properties of the media were tested employing a non-destructive rotating disk magnetometer. The recording characteristics and medium noise were measured at a linear density of 240 kiloflux change per inch (KFCI) employing a Guzik 1601 tester with a magnetoresistive (MR) head with a 0.35 $\mu$in gap length and flying at a nominal height of 2.1 $\mu$in.

Figure 3A:
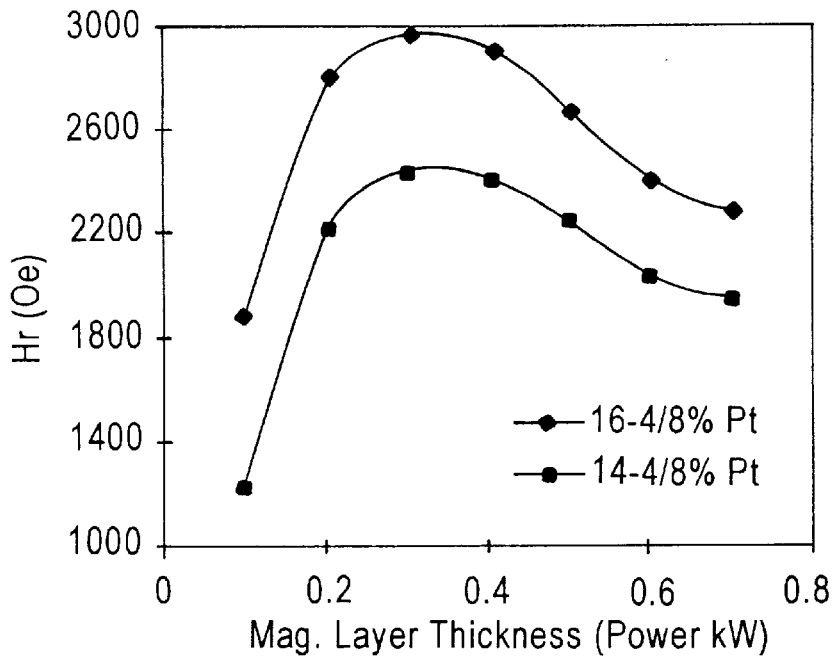
FIG. 3A shows Hr as a function of magnetic layer thickness for relatively high and relatively low Cr magnetic layers.
Figure 3B:
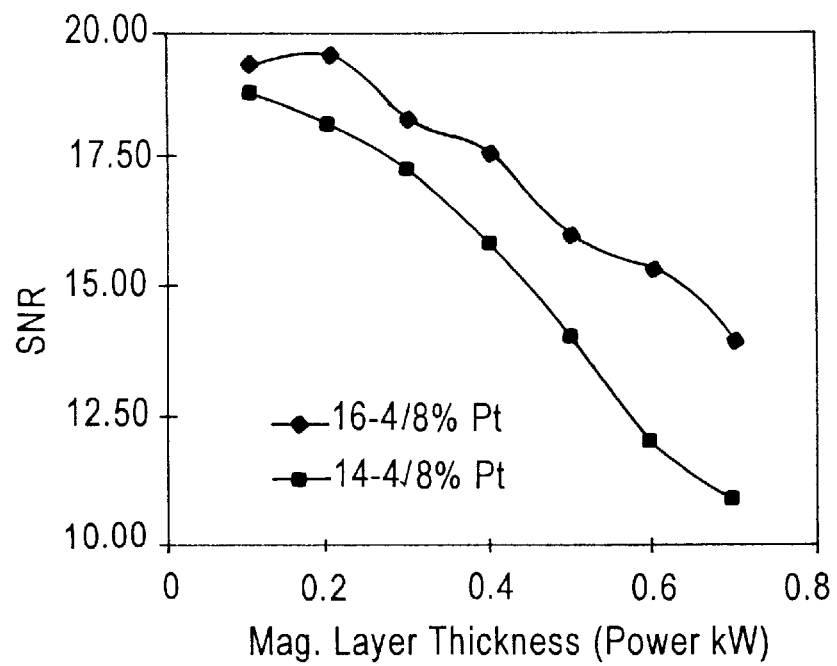
FIG. 3B shows SNR as a function of magnetic layer thickness for relatively high and relatively low Cr magnetic alloy layers.

FIG. 3A shows the Hr as a function of the CoCrPtTa magnetic layer thickness employing CoCrTa intermediate layers containing 16 and 14 atomic % Cr. FIG. 3B shows the SNR as a function of magnetic layer thickness employing CoCrTa intermediate layers containing 16 and 14 atomic % Cr. It is apparent from FIGS. 3A and 3B that a high Cr content CoCrTa intermediate layer yields higher Hr and SNR. It is believed that the relatively high Cr content in the film segregates the magnetic grains, thereby reducing magnetostatic interactions resulting in higher Hr.

The SNR, as shown in FIG. 3B, is superior for the medium containing the high Cr content CoCrTa intermediate layer. The higher the Cr content, the better the Cr segregation of the magnetic grains and the lower the exchange interactions leading to lower medium noise. Thus, the present invention provides a CoCrTa intermediate alloy having a high Cr content at a reduced thickness, thereby reducing the exchange interactions and improving media performance.

Figure 4A:
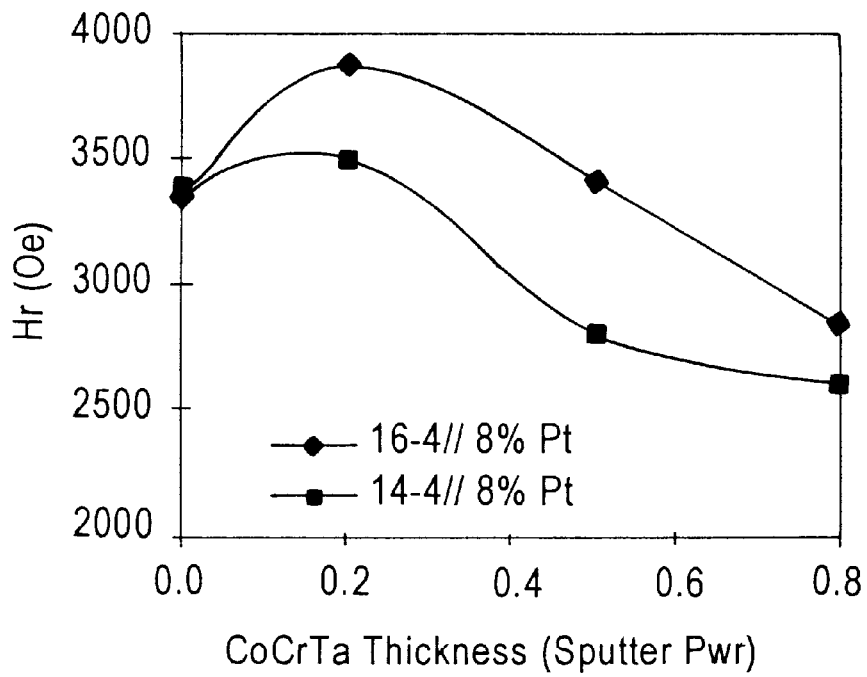
FIG. 4A shows Hr as a function of intermediate layer thickness for relatively high and relatively low Cr intermediate layers.
Figure 4B:
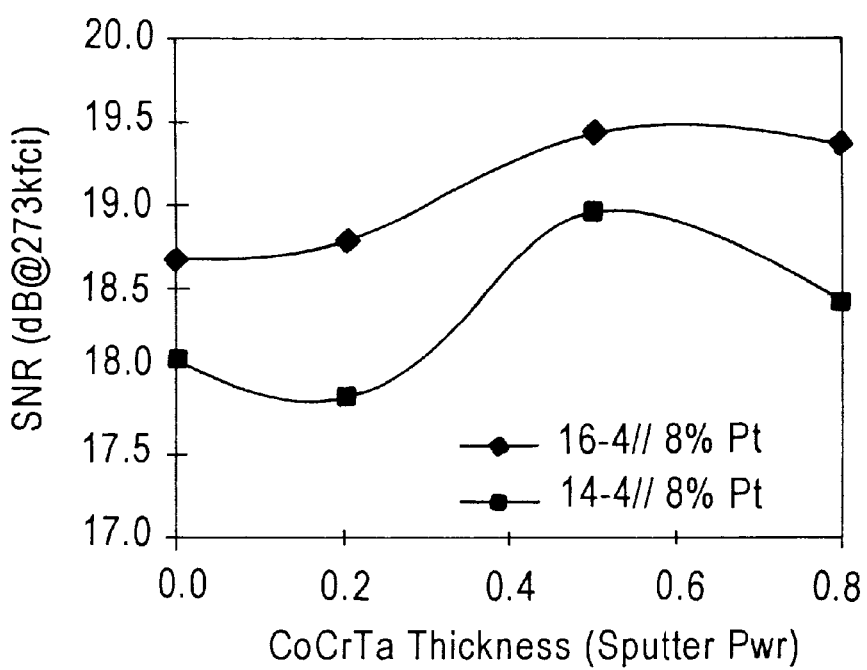
FIG. 4B shows SNR as a function of intermediate layer thickness for relatively high and relatively low Cr intermediate layers.

In FIG. 4A, Hr is shown as a function of intermediate alloy layer thickness for media comprising an intermediate layer of Co, 4 Ta and 16 Cr, and Co, 4 Ta, and 14 Cr (atomic %). FIG. 4B shows SNR as a function of intermediate layer thickness for the same media of FIG. 4A. The results reported in FIGS. 4A and 4B again show that as the Cr content of the CoCrTa intermediate layer increases, superior Hr and SNR are achieved.

The present invention, therefore, provides a high areal recording density magnetic recording medium with a strategically engineered CoCrTa intermediate layer having a high Cr content, e.g., about 16% to about 20 atomic % Cr, such as about 15.5 to about 17 atomic % Cr, at a thickness of about 5 to about 30Å. The high Cr content thin CoCrTa intermediate layer provides a smooth lattice match transition for epitaxial growth of subsequently deposited, highly anisotropic CoCrPtTa magnetic layers wherein the c-axes are aligned into the film plane, thereby achieving higher Hr and better S*. The like-atoms-growth effect allows the subsequently deposited CoCrPtTa magnetic alloys to grow in a way that the magnetic grains are well segregated by non-magnetic Cr. The segregation of magnetic grains reduces grain magneto-static interactions, thereby resulting in higher Hr. The segregation of magnetic grains also reduces grain exchange interactions, thereby reducing medium noise.

The present invention provides high areal density magnetic recording medium having a high Hr, high SNR and high S*. The present invention is applicable to the production of various types of magnetic recording media, and is not limited to any particular substrate material, underlayer, magnetic layer, protective overcoat or lubricant topcoat.

Only certain embodiments of the present invention and but a few examples of its versatility are shown and described in the present disclosure. It is to be understood that the present invention is cable of use in various other combinations and environments and is capable of changes and modifications within the scope of the inventive concept as expressed herein.

What is claimed is:

1. A magnetic recording medium comprising:

a non-magnetic substrate;

an underlayer on the substrate;

an intermediate layer, comprising an alloy of cobalt, greater than about 10 to about 20 atomic % chromium and tantalum, on the underlayer; and a magnetic layer on the intermediate layer; wherein:
the underlayer exhibits a (200)-dominant crystallographic orientation; and
the intermediate layer exhibits a (11.0)-dominant crystallographic orientation.

2. The magnetic recording medium according to claim 1, wherein the underlayer comprises chromium or a chromium alloy.

3. The magnetic recording medium according to claim 1, wherein the intermediate layer alloy comprises about 1 to about 6 atomic % tantalum.

4. The magnetic recording medium according to claim 3, wherein the underlayer comprises a chromium alloy.

5. The magnetic recording medium according to claim 4, wherein the chromium alloy comprises chromium and vanadium, tantalum or molybdenum.

6. The magnetic recording medium according to claim 3, wherein the magnetic layer comprises an alloy of cobalt, chromium, platinum and tantalum.

7. The magnetic recording medium according to claim 3, wherein the substrate comprises nickel-phosphorous plated on aluminum or an aluminum alloy, or a glass material.

8. The magnetic recording medium according to claim 3, wherein the intermediate layer alloy comprises about 16 to about 20 atomic % chromium.

9. The magnetic recording medium according to claim 8, wherein the intermediate layer alloy comprises about 16 to about 17 atomic % chromium.

10. A magnetic recording medium comprising:

a non-magnetic substrate;

an underlayer on the substrate;

an intermediate layer, comprising an alloy of cobalt, greater than about 10 to about 20 atomic % chromium and tantalum, on the underlayer: and a magnetic layer on the intermediate layer; wherein the intermediate layer has a thickness of about 5 to about 30Å.

11. The magnetic recording medium according to claim 10, wherein the intermediate layer comprises about 1 to about 6 atomic % tantalum.

* * * * *